(12) United States Patent
Milosavljevic

(10) Patent No.: US 10,369,876 B2
(45) Date of Patent: Aug. 6, 2019

(54) POWER TRAIN WITH A VARIABLE-SPEED TRANSMISSION AND MOTOR VEHICLE OF HYBRID TYPE USING SUCH A POWER TRAIN

(71) Applicant: IFP Energies nouvelles, Rueil-Malmaison (FR)

(72) Inventor: Misa Milosavljevic, Eragny sur Oise (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 78 days.

(21) Appl. No.: 15/523,075

(22) PCT Filed: Aug. 11, 2015

(86) PCT No.: PCT/EP2015/068493
§ 371 (c)(1),
(2) Date: Apr. 28, 2017

(87) PCT Pub. No.: WO2016/066296
PCT Pub. Date: May 6, 2016

(65) Prior Publication Data
US 2017/0326961 A1 Nov. 16, 2017

(30) Foreign Application Priority Data

Oct. 29, 2014 (FR) .................................... 14 60407

(51) Int. Cl.
*B60K 6/48* (2007.10)
*B60K 6/365* (2007.10)
(Continued)

(52) U.S. Cl.
CPC .............. *B60K 6/365* (2013.01); *B60K 6/383* (2013.01); *B60K 6/387* (2013.01); *B60K 6/48* (2013.01);
(Continued)

(58) Field of Classification Search
CPC ..... F16H 2200/2084; F16H 2200/2007; F16H 3/725; B60K 6/365; B60K 6/48;
(Continued)

(56) References Cited

U.S. PATENT DOCUMENTS

| 3,889,790 A | 6/1975 | Bricker |
| 5,437,356 A * | 8/1995 | Lohr ....................... F16D 43/18 192/103 B |

(Continued)

FOREIGN PATENT DOCUMENTS

| EP | 2 345 828 A1 | 7/2011 |
| FR | 2962697 A1 | 1/2012 |

OTHER PUBLICATIONS

International Search Report for PCT/EP2015/068493 dated Oct. 22, 2015; English translation submitted herewith (6 pages).

*Primary Examiner* — Roger L Pang
(74) *Attorney, Agent, or Firm* — Fitch, Even, Tabin & Flannery LLP

(57) ABSTRACT

The present invention relates to a powertrain for a motor vehicle comprising a thermal engine (10), a variable-speed transmission device (14) including an engine epicyclic gear train (26) with a sun gear (36) carried by a hollow shaft (42) and a crown gear (56) carried by a hollow shaft (62) surrounding hollow shaft (42) of the sun gear, the sun gear and the crown gear are each connected to shaft (12) of thermal engine (10) respectively by a controlled clutch (28 and a second controlled clutch 30) and to a fixed part (48) of the vehicle by a one-way clutch (32 and 34), and a track (126 and 128) for motion transmission to a drive axle (16). According to the invention, the powertrain comprises in addition to the first and second controlled clutches a controlled connection (132) between the two hollow shafts (42 and 62).

20 Claims, 1 Drawing Sheet

(51) Int. Cl.
*B60K 6/383* (2007.10)
*B60K 6/387* (2007.10)
*F16H 3/72* (2006.01)

(52) U.S. Cl.
CPC ...... *F16H 3/725* (2013.01); *B60K 2006/4816* (2013.01); *B60K 2006/4833* (2013.01); *F16H 2200/0021* (2013.01); *F16H 2200/2007* (2013.01); *F16H 2200/2082* (2013.01); *F16H 2200/2084* (2013.01); *F16H 2200/2094* (2013.01); *Y02T 10/6221* (2013.01); *Y02T 10/6256* (2013.01); *Y10S 903/911* (2013.01); *Y10S 903/913* (2013.01); *Y10S 903/914* (2013.01); *Y10S 903/919* (2013.01)

(58) Field of Classification Search
CPC .............................. B60K 6/383; B60K 6/387; B60K 2006/4816; B60K 2006/4833; Y10S 903/913; Y10S 903/914
USPC ........................................................... 475/5
See application file for complete search history.

(56) References Cited

U.S. PATENT DOCUMENTS

| | | | |
|---|---|---|---|
| 6,361,468 B1 * | 3/2002 | Kato | ................ F16H 3/663 475/344 |
| 6,592,484 B1 | 7/2003 | Tsai et al. | |
| 7,354,375 B2 * | 4/2008 | Brooks | ................ F16H 3/66 475/276 |
| 8,047,958 B2 * | 11/2011 | Wittkopp | ................ F16H 3/66 475/303 |
| 2011/0172044 A1 | 7/2011 | Venturi | |

\* cited by examiner

POWER TRAIN WITH A VARIABLE-SPEED TRANSMISSION AND MOTOR VEHICLE OF HYBRID TYPE USING SUCH A POWER TRAIN

CROSS-REFERENCE TO RELATED APPLICATIONS

Reference is made to International Application No. PCT/EP2015/068493 filed Aug. 11, 2015 and French Application No. 14/60.407 filed Oct. 29, 2014, which are hereby incorporated herein by reference in their entirety.

BACKGROUND OF THE INVENTION

Field of the Invention

The present invention relates to a powertrain comprising a variable-speed transmission device and to a hybrid type motor vehicle using powertrain.

Description of the Prior Art

As it is already known, a hybrid type vehicle comprises a powertrain that uses, alone or in combination, as a traction/propulsion drive, an internal-combustion thermal engine with a variable-speed transmission and a rotary electrical machine connected to an electrical source, such as one or more batteries.

This combination affords the advantage of optimizing performance of the vehicle, notably by reducing the discharge of emissions to the atmosphere and by decreasing the fuel consumption. When the vehicle is to be driven with a high torque over a wide speed range while limiting exhaust gas and noise generation, as in an urban site, the electrical machine is preferably used. On the other hand, the thermal engine is used for driving the vehicle for driving with a high power requirement and a wide operating range.

A powertrain, notably for a hybrid vehicle, with a variable-speed transmission device including an epicyclic gear train with a sun gear and a crown gear connected each to the thermal engine shaft by a controlled clutch and to a fixed part of the powertrain by a one-way clutch and another epicyclic gear train connecting the engine epicyclic gear train to a transmission track for motion transmission to the drive axle of the vehicle has been disclosed in French patent application No. 2,962,697 filed by the applicant.

With a view to continuous improvement, the applicant has further enhanced this variable-speed transmission device. Indeed, as better described in the aforementioned application, upon gear change, the two controlled clutches are in such a position that the speed and the driving torque of the engine shaft are not transmitted to the crown gear and the sun gear. This has the drawback of causing a break in the transmission of speed and of the driving torque to the drive axle, which generates driver discomfort.

SUMMARY OF THE INVENTION

The present invention overcomes the aforementioned drawbacks by a simple and inexpensive layout providing speed and driving torque continuity upon gear change.

The invention therefore relates to a powertrain for a motor vehicle comprising a thermal engine, a variable-speed transmission including an engine epicyclic gear train with a sun gear carried by a hollow shaft and a crown gear carried by a hollow shaft surrounding the hollow shaft of the sun gear. The sun gear and the crown gear are each connected to the thermal engine shaft by a controlled clutch and to a fixed part of the vehicle by a one-way clutch, and a track for motion transmission to a drive axle, which it comprises a controlled connection between the two hollow shafts.

The controlled connection can comprise at least one radial pad housed in the wall of the sun gear shaft and cooperating with the crown gear shaft. The pad can have an upper end with a surface made of a friction material for connection with the hollow shaft of the crown gear. The pad can be housed in a radial bore running through the shaft wall and opening into a hollow chamber of the shaft.

The hollow chamber can be limited by at least part of the hollow shaft wall and two transverse partitions. The chamber can be connected to a pressurizing device.

The pressurizing device can comprise a delivery line for feeding a fluid to the hollow chamber and a pressure device. The pressure device can comprise a piston and a device for controlling this piston.

Advantageously, the fluid can be lubricating oil.

The invention also relates to a hybrid type motor vehicle that can comprise a powertrain as mentioned above and a driving/generating machine.

BRIEF DESCRIPTION OF THE DRAWINGS

Other features and advantages of the invention will be clear from reading the description hereafter, given by way of non-limitative example, with reference to the accompanying figures wherein.

DETAILED DESCRIPTION OF THE INVENTION

Figure 1:
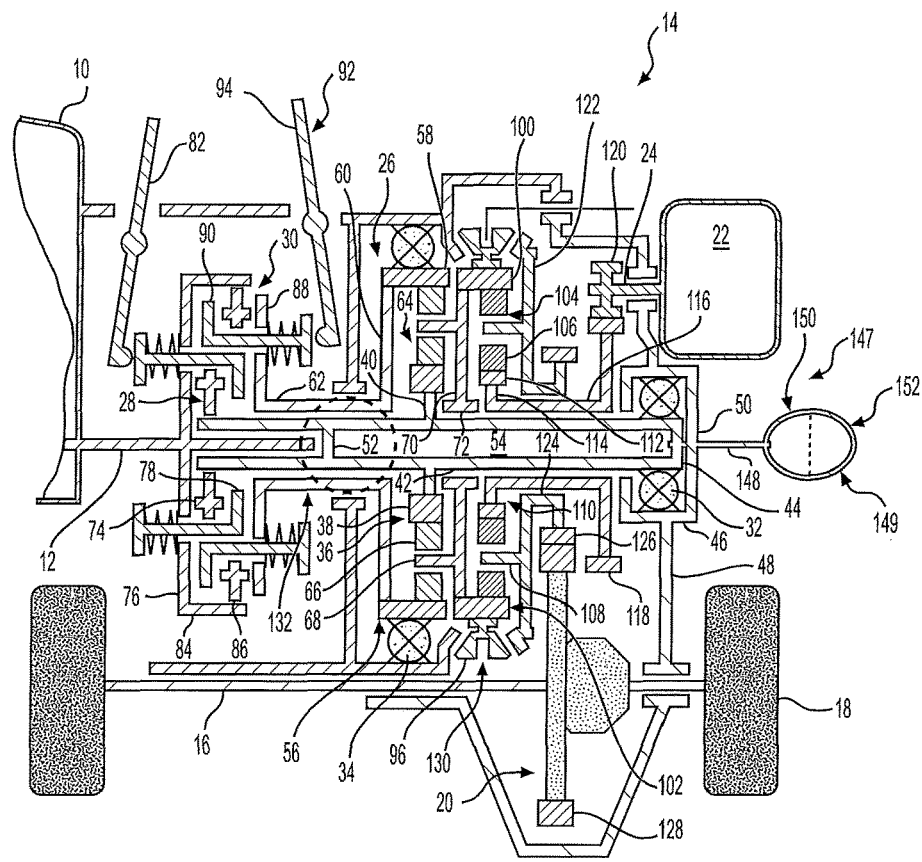
FIG. 1 is a diagram showing a powertrain according to the invention applied to a hybrid vehicle drive system.

In FIG. 1, the powertrain comprises a thermal engine 10, notably an internal-combustion engine, with an engine shaft 12, coming from the crankshaft of the engine, and a variable-speed transmission 14 and a drive axle 16 for driving wheels 18 of the vehicle, advantageously by means of a differential bridge 20.

Engine shaft 12 can also perform the function of a receiving shaft but, for description simplification reasons, this shaft will be referred to as engine shaft hereafter for distinguishing this shaft from other shafts of the transmission.

The powertrain also comprises a driving and generating machine 22 with a rotor 24. By way of example only, this machine is an electrical machine connected to batteries (not shown) that is used either as an electrical motor for propelling the vehicle or as a power generator for charging the batteries or powering the electrical accessories of the vehicle.

Variable-speed transmission 14 comprises a main epicyclic gear train 26, which is referred to as thermal engine epicyclic gear train having two controlled clutches 28 and 30, such as disc clutches, and two one-way automatic clutches, such as free wheels 32 and 34.

More precisely, engine epicyclic gear train 26 comprises a sun gear 36 with an externally toothed strip 38 carried by a flange 40. Flange 40 is fixedly mounted on a cylindrical hollow shaft 42, which is referred to as sun gear shaft, that surrounds engine shaft 12 while being free to rotate but is fixed to not translate with respect thereto. Free end 44 of shaft 42 rests on a bearing 46 carried by a fixed part 48 of the powertrain through one-way clutch 32, which is referred to as sun gear free wheel.

The sun gear hollow shaft is sealed by a partition 50 at end 44 thereof and carries, also in a sealed manner, an inner partition 52 that is housed in the hollow part of shaft 42 which is opposite to the free end of engine shaft 12, which limits a hollow chamber 54.

The gear train also comprises a crown gear 56 having an internally toothed ring 58 which is concentric to the sun gear, and a web 60 which is connected to a cylindrical hollow shaft 62, which is referred to as crown gear shaft, that surrounds the sun gear hollow shaft 42 which is free to rotate, but is fixed not translate with respect thereto. The crown gear is externally connected to fixed part 48 of the vehicle powertrain by one-way clutch 34, which is referred to as crown gear free wheel.

As is more visible in FIG. 1, inner partition 52 is arranged in such a way that hollow chamber 54 of sun gear shaft 42 matches at least part of hollow shaft 62 of the crown gear.

Notably, the two free wheels 32 and 34 are positioned so that the crown gear 56 and sun gear 36 can rotate only in the same direction, and preferably in the same direction as engine shaft 12.

Finally, the engine epicyclic gear train comprises a planet gear carrier 64 with advantageously three planet gears 66 having externally toothed wheels, angularly spaced at the same angular interval with respect to one another (120° here) and meshing with the crown gear and the sun gear.

Ring 58 of the crown gear, strip 38 of the sun gear and planet gears 66 are located in the same plane, in which is a vertical plane in FIG. 1.

The planet gears are each carried by a horizontal pin 68, are free to rotate, but are fixed to not translate thereon. The planet gear pins are connected to a vertical wall 70 connected to a tubular bearing 72, which is referred to as planet gear carrier bearing and which surrounds sun gear shaft 42 and is to rotate thereon.

The free ends of the sun gear and crown gear shafts each carry a controlled clutch 28 and 30 which preferably is a disc clutch.

Thus, clutch 28, which is referred to as sun gear clutch, comprises a friction disc 74, fixed to not rotate but is free in axially translate on the sun gear shaft 42. The friction disc is clamped between a reaction plate 76 which is mounted to not translate and to rotate on engine shaft 12 and a pressure plate 78 which is free to translate with respect to the pressure plate but is fixed to not rotate therewith. The axial motion of the pressure plate is controlled by a clutch actuator 80, which here is a lever 82 that pivots on a fixed point of the powertrain.

Pressure plate 76 is extended, on the periphery thereof, by a horizontal wall 84 that carries another friction disc fixed to not rotate but is free axially translate. The friction disc 86 is coaxial with friction disc 74 and is part of the other clutch 30 which is referred to as a crown clutch.

Friction disc 86 is clamped between a reaction plate 88 is mounted to not in translate and is free to rotate on the free end of crown shaft 62, and a pressure plate 90 which axially translates in response to the action of another clutch actuator 92. As mentioned above, this actuator comes is a lever 94 which pivots on a fixed point of the powertrain.

Advantageously, and as better illustrated in FIG. 1, engine epicyclic gear train 26 is connected to another epicyclic gear train 96, which is referred to as motion distribution train. The main purpose of the gear train 96 is to transmit the rotational motion from machine 22 to drive axle 16 when the vehicle is used in at least one of a hybrid mode and an engine powered by engine 10 and epicyclic gear train 26 to the drive axle 16.

By way of example only, vertical wall 70 of planet gear carrier 64 carries, on the face opposite planet gears 66, an internally toothed horizontal strip 100. The wall 70 and the strip 100 form crown 102 of the motion distribution epicyclic gear train.

The distribution epicyclic gear train 96, which is coaxially mounted relative to engine epicyclic gear train 26, surrounds sun gear shaft 42. The gear train 96 comprises a planet gear carrier 104 which advantageously has three planet gears 106, in the form of externally toothed wheels, which are carried by planet gear pins 108. The planet gears are arranged in the same angular interval with respect to one another (120° here) and mesh with the teeth of strip 100 of crown 102.

The planet gears 106 also cooperate by meshing with a sun gear 110. The sun gear 110 comprises an externally toothed strip 112 and is carried by a flange 114. Flange 114 is fixedly mounted on a tubular shaft 116, which is referred to as additional sun gear shaft. The flange 114 surrounds sun gear shaft and is free to rotate but is fixed to not translate relative to sun gear shaft 42 of engine epicyclic gear train 26. The free end of tubular shaft 116 is fixed to a toothed wheel 118 that cooperates with another toothed wheel 120 which is fixed to rotor 24 of the electric machine.

Planet gear pins 108 are carried by a plate 122 which are part of the planet gear carrier and comprise a tubular bearing 124 which surrounds the sun gear tubular shaft and is free to rotate but is fixed to not translate sun gear tubular shaft 116.

Bearing 124 is fixed to a toothed wheel 126 that cooperates with a toothed wheel 128 linked to drive axle 16. This assembly of two toothed wheels forms a motion transmission track between epicyclic gear train 96 and axle 16.

The epicyclic gear train 96 also carries a controlled clutch 130 which allows crown 102 to be connected either to plate 122 or to fixed part 48 of the powertrain depending on the drive mode selected for the vehicle.

Figure 2:
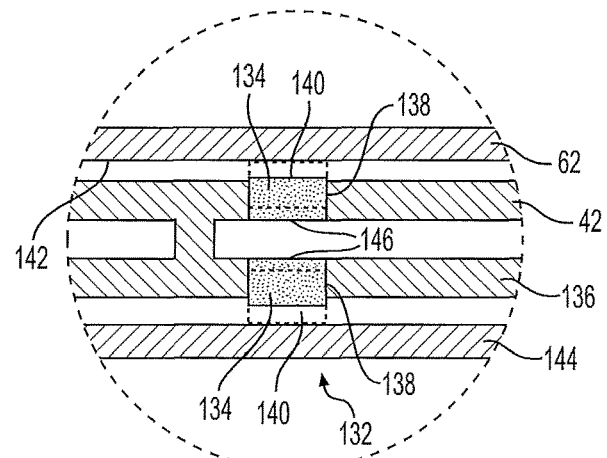
FIG. 2 is an enlarged scale view of the details of the transmission device.

As is more clearly visible in FIG. 2, the transmission device comprises a controlled connection 132 between hollow shaft 42 of sun gear 36 and hollow shaft 62 of crown 54 of engine epicyclic gear train 26.

The connection 132 is a radial pad 134 having two diametrically opposed pads here, carried by circular wall 136 of sun gear hollow shaft 42.

The pads advantageously have a circular section and are carried so that bores 138 provide a seal running through wall 136 of the hollow shaft.

The pads have an upper end 140 facing inner face 142 of wall 144 of shaft 62, which has a curved profile substantially identical to the profile of face 142. Wall 144 and lower end 146 which is opposite to hollow chamber 54 is advantageously made of a friction material, and can forced to move in the direction of inner face 142 of wall 144.

Of course, without departing from the scope of the invention, these pads can be entirely made of a friction material.

In the example illustrated in FIGS. 1 and 2, the force is generated by the pressurization of chamber 54 through a pressurizing device 147, which is hydraulic.

End partition 50 of shaft 42 is therefore traversed by a line 148 which delivers a fluid under pressure. Advantageously, this fluid is oil from the variable-speed transmission device or engine lubricating oil. Delivery of this fluid and pressurization thereof within chamber 54 through line 148 is controlled by any known device 149 such as a piston 150 controlled by a control 152.

Of course, other known pressurizing devices known, such as a pump or a piston pump for example, can be used.

During operation of the powertrain with thermal engine 10, one of the clutches 28 is in an engaged position while the other clutch 30 is in disengaged position for obtaining a gear ratio, and controlled connection 132 is inoperative.

In this case, the speed (and engine torque) from engine shaft 12 is successively transmitted to clutch 28, hollow shaft 42, sun gear 36, planet gear carrier 64 of the engine epicyclic gear train, to crown gear 102, planet gear carrier 104, toothed wheels 126 and 128, and to drive axle 16.

In another gear ratio, clutch 28 shifts from the engaged position to the disengaged position, clutch 30 shifts from the disengaged position to the engaged position.

During these travels, there is a configuration where none of the clutches is active and the engine speed (and the engine torque) is retransmitted neither to hollow shaft 42 of sun gear 36, nor to hollow shaft 62 of the crown.

This leads to a break in the transmission of speed and engine torque, and to a jerk as clutch 30 engages.

To overcome this, when changing gear, controlled connection 132 is activated.

Control 152 therefore activates piston 150 to inject the fluid under pressure into chamber 54. The pressurization of the chamber 54 applies a force to the lower ends 146 of the pads which pushes them towards inner wall 142 of hollow shaft 62.

After contact with friction of upper ends 140 of the pads, sun gear shaft 42 is rotatably connected to shaft 62 of the crown and the rotational motion of shaft 12 is retransmitted to gear trains 26 and 96 and to the axle.

Thus, after contact with friction of upper ends 140 of the pads, sun gear shaft 42 moves and accelerates shaft 62 by its kinetic energy. Shaft 42 therefore slows down and, when slowing down of shaft 42 and acceleration of shaft 62 are initiated, controlled connection means 132 is deactivated and clutch 30 is in engaged position.

This allows a "one-off" that never connects the two shafts permanently but does provide, through friction, kinetic energy transfer from the moving shaft 42, which it is destined to stop, to the shaft 62 which is intended to start moving.

The transition is thus accelerated and the break in torque is nearly unnoticeable by the driver.

Sun gear 36 is then at a standstill while crown 56 is driven to rotate by engine shaft 2 under the action of clutch 30.

Thus, by decreasing the dead time (time required for shaft 62 to come to a standstill) during which the torque cannot be transmitted from the engine to the wheels, the break in torque is less perceivable by the driver but, also, the energy required for-compensating for the torque at wheel during this transition decreases.

It is of course within the skill of persons in the art to parametrize the length of time for which this connection is active or to provide any mechanism, such as detectors, for determining the engaged/disengaged positions of the clutches.

The invention claimed is:

1. A powertrain for a motor vehicle comprising:
a thermal engine and a variable-speed transmission including an engine epicyclic gear train having a sun gear carried by a hollow shaft and a crown gear which is carried by a hollow shaft that surrounds the hollow shaft carrying the sun gear; and wherein
the sun gear and the crown gear are each connected to a shaft of the thermal engine respectively by a first controlled clutch and a second controlled clutch and to a fixed part of the vehicle by a one-way clutch, and further including a track transmission for transmission of motion to a drive axle including a controlled connection between the hollow shafts while the first and second controlled clutches are not active.

2. A powertrain as claimed in claim 1, wherein:
the controlled connection comprises at least one radial pad housed in a wall of the gear shaft carrying the sun gear which cooperates with the shaft carrying the crown gear.

3. A powertrain as claimed in claim 2, wherein:
the pad has an upper end having a surface comprising a friction material for connection to the shaft carrying the crown gear.

4. A powertrain as claimed in claim 2, wherein:
the pad is housed in a radial bore extending through the wall of the shaft carrying the sun gear and opens into a hollow chamber of the shaft carrying the crown gear.

5. A powertrain as claimed in claim 3, wherein:
the pad is housed in a radial bore extending through the wall of the shaft carrying the sun gear and opens into a hollow chamber of the shaft carrying the crown gear.

6. A powertrain as claimed in claim 4, wherein:
the hollow chamber is limited by at least part of the wall of the shaft carrying the sun gear and two transverse partitions.

7. A powertrain as claimed in claim 5, wherein:
the hollow chamber is limited by at least part of the wall of the shaft carrying the sun gear and two transverse partitions.

8. A powertrain as claimed in claim 4, wherein:
the chamber is connected to a pressurizing device.

9. A powertrain as claimed in claim 5, wherein:
the chamber is connected to a pressurizing device.

10. A powertrain as claimed in claim 6, wherein:
the chamber is connected to a pressurizing device.

11. A powertrain as claimed in claim 7, wherein:
the chamber is connected to a pressurizing device.

12. A powertrain as claimed in claim 8, wherein:
the pressurizing device comprises a delivery line for feeding a fluid to the hollow chamber and a pressuring device.

13. A powertrain as claimed in claim 9, wherein:
the pressurizing device comprises a delivery line for feeding a fluid to the hollow chamber and a pressuring device.

14. A powertrain as claimed in claim 10, wherein:
the pressurizing device comprises a delivery line for feeding a fluid to the hollow chamber and a pressuring device.

15. A powertrain as claimed in claim 11, wherein:
the pressurizing device comprises a delivery line for feeding a fluid to the hollow chamber and a pressuring device.

16. A powertrain as claimed in claim 12, wherein:
the pressuring device comprises a piston and a control for controlling the piston.

17. A powertrain as claimed in claim 13, wherein:
the pressuring device comprises a piston and a control for controlling the piston.

18. A powertrain as claimed in claim 14, wherein:
the pressuring device comprises a piston and a control for controlling the piston.

19. A powertrain as claimed in claim 15, wherein:
the pressuring device comprises a piston and a control for controlling the piston.

20. A powertrain as claimed in claim 12, wherein the fluid is lubricating oil.

* * * * *